(12) United States Patent
Mabuchi et al.

(10) Patent No.: US 9,695,348 B2
(45) Date of Patent: Jul. 4, 2017

(54) WORKING MEDIUM FOR ABSORPTION REFRIGERATORS, AND ABSORPTION REFRIGERATOR USING THE SAME

(71) Applicants: HITACHI, LTD., Tokyo (JP); HITACHI APPLIANCES, INC., Tokyo (JP)

(72) Inventors: Katsumi Mabuchi, Tokyo (JP); Tatsuo Fujii, Tokyo (JP); Nobuyuki Takeda, Tokyo (JP)

(73) Assignee: HITACHI-JOHNSON CONTROLS AIR CONDITIONING, INC., Tokyo (JP)

( * ) Notice: Subject to any disclaimer, the term of this patent is extended or adjusted under 35 U.S.C. 154(b) by 0 days.

(21) Appl. No.: 14/850,016

(22) Filed: Sep. 10, 2015

(65) Prior Publication Data

US 2016/0075928 A1 Mar. 17, 2016

(30) Foreign Application Priority Data

Sep. 11, 2014 (JP) .................. 2014-184804

(51) Int. Cl.
*C09K 5/04* (2006.01)
*F25B 21/02* (2006.01)

(52) U.S. Cl.
CPC .............. *C09K 5/047* (2013.01); *F25B 21/02* (2013.01)

(58) Field of Classification Search
None
See application file for complete search history.

(56) References Cited

U.S. PATENT DOCUMENTS

| 2,185,040 A | * | 12/1939 | Smith | C09K 5/047 |
| | | | | 252/193 |
| 4,428,854 A | * | 1/1984 | Enjo | C09K 5/047 |
| | | | | 252/364 |
| 5,547,600 A | * | 8/1996 | Downey | C09K 5/047 |
| | | | | 252/68 |

FOREIGN PATENT DOCUMENTS

| JP | 11-080978 A | 3/1999 |
| WO | 2004/087830 A1 | 10/2001 |

* cited by examiner

*Primary Examiner* — Necholus Ogden, Jr.
(74) *Attorney, Agent, or Firm* — Volpe and Koenig, P.C.

(57) ABSTRACT

Provided is a working medium of the present invention for absorption refrigerators is a mixture that is to contact a carbon steel or a copper alloy that is a structural material of any one of the absorption refrigerators, and includes water and 1,4-dioxane, and further includes a corrosion inhibitor. The corrosion inhibitor includes one or more selected from the group consisting of respective hydroxides of any alkali metal and any alkaline earth metal, and respective oxoates. Thus, corrosion of the structural material of the absorption refrigerator can be restrained.

3 Claims, 3 Drawing Sheets

WORKING MEDIUM FOR ABSORPTION REFRIGERATORS, AND ABSORPTION REFRIGERATOR USING THE SAME

CLAIM OF PRIORITY

The present application claims priority from Japanese Patent application serial No. 2014-184804, filed on Sep. 11, 2014, the content of which is hereby incorporated by reference into this application.

BACKGROUND OF THE INVENTION

Field of the Invention

The present invention relates to a working medium for absorption refrigerators, and an absorption refrigerator using this medium.

Description of Related Art

A working medium used generally in conventional absorption refrigerators is a lithium-bromide/water system. Water is a cooling medium, and lithium bromide is an absorbing liquid. Accordingly, the water which is the cooling medium is frozen in an evaporator for generating a cold energy, the evaporator constituting the absorption refrigerator. It is therefore difficult that temperature of a heat medium for transporting the cold energy is adjusted to a temperature below a freezing point of water in the absorption refrigerator having an ordinary specification.

International Publication WO 2004/087830 (Patent Literature 1) discloses an absorption refrigerator in which a cold energy corresponding to the freezing point or lower is obtained by using a lithium-bromide/water system working medium including 1,4-dioxane as an additive which is a boiling-point-lowering-type organic substance having an azeotropic point with water.

From the viewpoint of prevention of corrosion of parts formed of a stainless steel used for the apparatus, Japanese Patent Application Laid-Open No. Hei 11-080978 (Patent Literature 2) discloses an aqueous solution composition for an absorption heat pump that contains lithium bromide as a main component, and a molybdate and an alkali hydroxide as inhibitors, the concentration of the alkali hydroxide being restricted.

"Kurita Industrial Chemicals Handbook", edited by Kurita Water Industries chemicals Handbook Editorial Committee (Non Patent Literature 1) describes aminotrimethylenephosphonic acid which is of a phosphonic acid type and is widely used as a corrosion inhibitor for cooling-water systems.

SUMMARY OF THE INVENTION

The working medium of the present invention for absorption refrigerators is a mixture that is to contact a carbon steel or a copper alloy that is a structural material of any one of the absorption refrigerators, and includes water and 1,4-dioxane, and further includes a corrosion inhibitor. The corrosion inhibitor includes one or more selected from the group consisting of respective hydroxides of any alkali metal and any alkaline earth metal, and respective oxoates.

The present invention makes it possible to restrain a structural material of an absorption refrigerator which generates the freezing point of water from being corroded with a water/dioxane mixed cooling medium used in the absorption refrigerator.

DETAILED DESCRIPTION OF THE PREFERRED EMBODIMENTS

Figure 1:
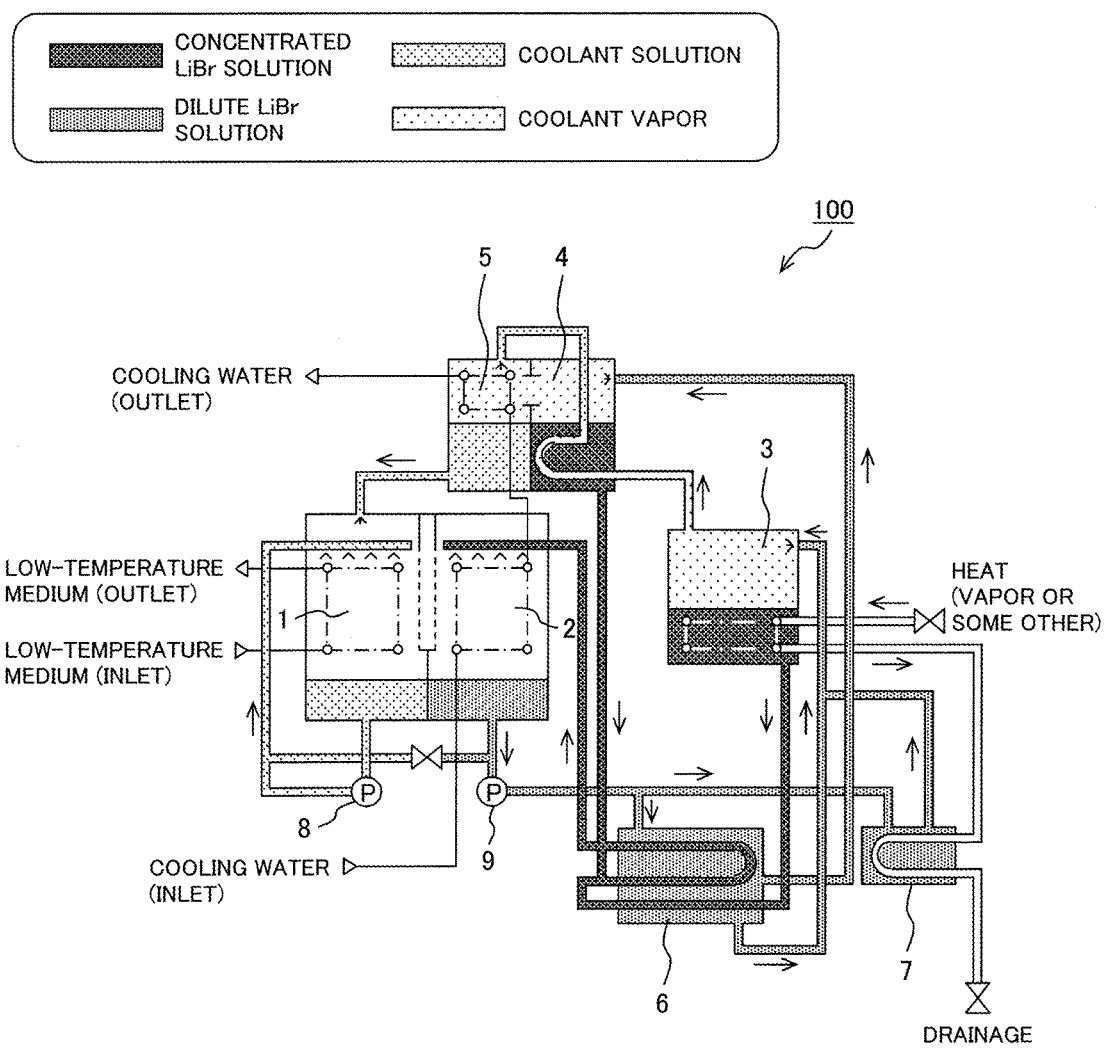
FIG. 1 is a schematic structural view illustrating an absorption refrigerator for generating a freezing point of water.

A simple substance of each of water and 1,4-dioxane is not very strong in corrosiveness, or corroding power to structural materials, for example, a material SS400. However, a mixed cooling medium in which 1,4-dioxane is added to water is remarkably increased in corrosiveness thereto. A reason for this increase in the corrosiveness is based on a matter that the ring structure of 1,4-dioxane is broken so that the ring is opened to produce a carboxylic acid or some other. Accordingly, in the case of configuring an absorption refrigerator by using a 1,4-dioxane/water mixed cooling medium as a cooling medium, it is indispensable to establish a technique of preventing the corrosion based on the mixed solvent.

Patent Literature 1 never describes any corrosion inhibitor.

Patent Literature 2 never describes any system using 1,4-dioxane.

An object of the present invention is to restrain a structural material of an absorption refrigerator, which generates a freezing point of water, from being corroded with a water/dioxane mixed cooling medium used in the absorption refrigerator.

The present invention relates to an absorption refrigerator in which a cold energy corresponding to a solidifying point of water (the freezing point thereof) or lower, particularly to an absorption refrigerator excellent in a corrosion resistance. The corrosion of a main structural member of this refrigerator is restrained at a high level by adding an alkali hydroxide or oxoate to the cooling medium when a water/dioxane mixed solution is used as a cooling medium (working medium).

Conventionally, corrosion inhibitors used in cooling-water are roughly classified into types as described below on the basis of the mechanism thereof.

(1) Adsorption type: any inhibitor of this type causes a chemical adsorption:

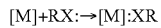
[M]+RX:→[M]:XR (2) Oxidation type: any inhibitor of this type causes a production of a precipitation of a hydroxide:

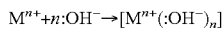
$M^{n+}+n:OH^- \rightarrow [M^{n+}(:OH^-)_n]$ (3) Precipitation type: any inhibitor of this type causes a production of a precipitation of a complex:

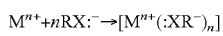
$M^{n+}+nRX:^- \rightarrow [M^{n+}(:XR^-)_n]$

In each of these expressions, [M] or M^n+ represents a Lewis acid; and RX:, :OH⁻, RX:⁻, and others are each a Lewis base.

However, as described above, a cause for corrosion in a 1,4-dioxane/water system is that the ring structure of 1,4-dioxane is broken so that the ring is opened to produce a carboxylic acid or some other. Thus, in order to restrain the corrosion, it is necessary to prevent the ring-opening of the ring structure of 1,4-dioxane. However, it cannot be presumed whether or not the corrosion inhibitors produce an advantageous effect based on a conventional corrosion-restraining mechanism also in a 1,4-dioxane/water system.

In order to solve the above-mentioned problems, the inventors have made eager researches to achieve the present invention. Specifically, by adding an alkali metal hydroxide, an alkaline earth metal hydroxide or an oxoate to a 1,4-dioxane/water mixed cooling medium which is high in corrosiveness, the resultant medium can exhibit a sufficient corrosion-restraining effect to make it possible to configure the absorption refrigerator using the 1,4-dioxane/water mixed cooling medium to generate a cold energy corresponding to 0° C. or lower. The effect can be obtained also by using a combination of an alkali metal hydroxide or alkaline earth metal hydroxide with an oxoate.

Examples of the alkali metal hydroxide are LiOH, NaOH, KOH, RbOH, and CsOH. These hydroxides each exhibit a corrosion-restraining effect. Of these hydroxides, LiOH, NaOH and KOH are preferred from the viewpoint of the solubility and the corrosion-restraining effect thereof. Since LiBr is frequently used as an absorbing liquid, it is particularly preferred to use a hydroxide of Li which is identical with the alkali metal of LiBr. When the concentration of the hydroxide of the alkali metal is 0.1 M, the corrosion-preventing effect is obtained. However, even when the concentration is 0.02 M which is a lower concentration than 0.1 M, a sufficient corrosion-restraining effect is obtained. When the hydroxide is added to the cooling medium in the concentration of 0.1 M or more, the effect is obtained. However, an improvement in the effect is small. When the concentration is 0.005 M or less, the corrosion-restraining effect of the alkali metal hydroxide is small and further the corrosion-restraining effect is unfavorably lost by the consumption of the hydroxide. From these matters, the range of optimal concentrations of the hydroxide is from 0.02 to 0.15 M.

Examples of the alkaline earth metal hydroxide are Be(OH)$_2$, Mg(OH)$_2$, Ca(OH)$_2$, Sr(OH)$_2$, and Ba(OH)$_2$. Of these hydroxides, Ca(OH)$_2$ is preferred from the viewpoint of the solubility and the corrosion-restraining effect thereof. When the concentration of the hydroxide of the alkaline earth metal is 0.1 M, the corrosion-preventing effect is obtained. However, even when the concentration is 0.02 M, which is a lower concentration than 0.1 M, a sufficient corrosion-restraining effect is obtained. When the hydroxide is added to the cooling medium in the concentration of 0.1 M or more, the effect is obtained. However, an improvement in the effect is small. When the concentration is 0.005 M or less, the corrosion-restraining effect of the alkaline earth metal hydroxide is small and further the corrosion-restraining effect is unfavorably lost by the consumption of the hydroxide. From these matters, the range of optimal concentrations of the hydroxide is from 0.02 to 0.15 M. Ca(OH)$_2$ has a low solubility (about 0.02 M at 25° C.). Thus, a saturated solution thereof may be used.

The addition of the alkali metal hydroxide or alkaline earth metal hydroxide causes a rise in the pH of the solution, so that the solution exhibits alkalinity. However, the addition of NH$_3$ or Na$_2$CO$_3$ which exhibits alkalinity in the same way does not produce any corrosion-restraining effect. In general, by making a solution alkaline, an iron hydroxide is produced on an outer surface of a metal such as iron steel in the solution, so that the corrosion of the metal is restrained. However, in a water/dioxane system, no corrosion-restraining effect is exhibited even when NH$_3$ or Na$_2$CO$_3$ which is an alkali is added to the system. This is because the corrosion-restraining mechanism in this case is based not on the production of any iron hydroxide, but on a mechanism of preventing the ring-opening of the ring structure of 1,4-dioxane. In other words, any alkali metal hydroxide or alkaline earth metal hydroxide has an effect of preventing the ring-opening of the ring structure of 1,4-dioxane, but NH$_3$ or Na$_2$CO$_3$ does not have such an effect.

An oxoate is a chemical substance which is other than any alkali metal hydroxide and any alkaline earth metal hydroxide, and which exhibits an effect of preventing the ring-opening of the ring structure of 1,4-dioxane.

Examples of the oxoate include molybdates, tungstates, vanadiates, silicates, phosphates, polyphosphates, phosphonates, hypochlorites, chlorites, perchlorates, and sulfonates. Specific examples thereof include lithium molybdate, sodium molybdate, ammonium molybdate, sodium tungstate, ammonium vanadiate, sodium orthovanadiate, sodium silicate, sodium metasilicate, sodium phosphonate, sodium dihydrogenphosphate, ammonium dihydrogenphosphate, sodium hydrogenpyrophosphate, sodium metaphosphate, sodium polyphosphate, sodium hypochlorite, sodium chlorite, and sodium perchlorate. As far as the oxoate is any one of these oxoates, a corrosion-restraining effect is exhibited without any especial restriction.

When the oxoate is added in a concentration of 0.01 M, a corrosion-preventing effect is obtained. Even when the concentration is 0.002 M which is a lower concentration than 0.01 M, a sufficient corrosion-restraining effect is obtained. However, the corrosion-restraining effect is decreased as the concentration is lowered. When the concentration is 0.002 M or less, the corrosion-restraining effect is small and further the corrosion-restraining effect is unfavorably lost by the consumption of the oxoate. From these matters, the range of optimal concentrations of the oxoate is from 0.002 to 0.01 M. In an ordinary cooling-water, an oxidizer causes the production of a thin passive film on the outer surface of a metal to exhibit a corrosion-restraining effect. However, in a water/dioxane system, an oxidizer such as hydrogen peroxide, potassium nitrate, sodium nitrite or ceriumammonium nitrate does not exhibit any corrosion-restraining effect although the oxoate which is also an oxidizer exhibits the corrosion-restraining effect. This is because the corrosion-restraining mechanism of the oxoate is based not on the production of the passive film by the oxidizer, but on the effect of preventing the ring-opening of the ring structure of the 1,4-dioxane.

For the same reason, adsorption type corrosion inhibitors which exhibit a corrosion-restraining effect in an ordinary cooling-water do not exhibit any corrosion-restraining effect in a water/dioxane system, examples of the inhibitors including hexamethylenetetramine, thiourea, hexanethiol, and dimethylhexabenzylamine. 8-quinolinol or sodium octylpropionate which is a precipitation type corrosion inhibitor does not exhibit any corrosion inhibitor in a water/dioxane system, either.

FIG. 1 is a schematic view illustrating a structure and connection of units of an absorption refrigerator preferred for carrying out the present invention.

In FIG. 1, the absorption refrigerator which is a refrigerator 100 is composed of an evaporator 1, an absorber 2, a high-temperature regenerator 3, a low-temperature regenerator 4, a condenser 5, and a solution heat exchanger 6. Of these units, the evaporator 1, the absorber 2 and the condenser 5 are kept in a vacuum having a pressure of several millimeters of mercury. A cooling medium used in the evaporator 1 is a water/1,4-dioxane mixed cooling medium (hereinafter referred merely to also as a "mixed cooling medium"). A molar fraction of water is 0.85 when the mixed cooling medium is sealed into the evaporator 1. In order to relieve a high corrosiveness of the water/1,4-dioxane mixed cooling medium, LiOH is added as a corrosion inhibitor to this cooling medium to have a concentration of 0.3%. An absorption liquid used in the absorber 2 is a concentrated LiBr solution having a very low water vapor pressure. The high-temperature regenerator 3 and the low-temperature regenerator 4 may be collectively called the "regenerator".

At a lower part of the evaporator 1, a pump 8 is located for spraying the mixed cooling medium that remains in a bottom part of the evaporator 1 from an upper part of the evaporator 1. At a lower part of the absorber 2, a pump 9 is located for spraying the absorption liquid that remains in a bottom part of the absorber 2 from an upper part of the absorber 2.

When a low-temperature medium is supplied, the following are sprayed from the upper part of the evaporator 1: the water/1,4-dioxane mixed cooling medium that is produced in the condenser 5; and the water/1,4-dioxane mixed cooling medium that remains in the bottom part of the inside of the evaporator 1. Thus, these cooling mediums are vacuum-evaporated on an outside surface of a cooling pipe located inside the evaporator 1. By vaporization heat of the evaporation, the cooling medium inside the cooling pipe is cooled to yield a low-temperature medium.

However, when the vacuum evaporation is continued, the vacuum degree is lowered by generated vapor of the mixed cooling medium so that the cooling efficiency is lowered. Thus, in order to continue the vacuum evaporation efficiently, it is necessary to remove the mixed cooling medium vapor generated in the evaporator 1 to keep the vacuum. For this purpose, the mixed cooling medium vapor generated in the evaporator 1 is absorbed into the concentrated LiBr solution in the absorber 2. The absorption liquid diluted by the absorption of the mixed cooling medium vapor (diluted solution) is heated in the solution heat exchanger 6, and subsequently sent to the high-temperature regenerator 3 and the low-temperature regenerator 4.

In the high-temperature regenerator 3, the absorption liquid is heated and concentrated by vapor or some other as one or more heat sources supplied from the outside. Vapor of the mixed cooling medium thus produced attains the heating of the low-temperature regenerator 4 to be condensed into the mixed cooling medium. The mixed cooling medium is sprayed inside the condenser 5. The vapor or the other as the heat source that has passed through the high-temperature regenerator 3 turns to condensed water. The condensed water is used to heat the diluted solution in a drain cooler 7, thereby being further cooled, and then discharged as a drainage.

The vapor of the mixed cooling medium produced by heating the absorption liquid in the low-temperature regenerator 4 is condensed by a cooling-water inside the condenser 5, and subsequently sent to the evaporator 1. The heated cooling-water is cooled by heat-radiation into the atmosphere in a cooling tower or some other.

In order to verify advantageous effects of the present invention, a corrosion test of a structural material SS400 was made in a solution prepared by adding each of various alkalis to a mixed cooling medium to measure a quantity of a gas generated by the corrosion of the structural material. An anode reaction of the corrosion is a dissolution reaction of iron, which is represented by a reaction formula (1) illustrated below. A cathode reaction paired with the anode reaction is a hydrogen-gas-generating reaction represented by a reaction formula (2) illustrated below. The quantity of the generated hydrogen gas is in proportion with the quantity of the corrosion in this way. Thus, it can be determined from the quantity of the generated hydrogen gas whether the degree of the corrosion is large or small.

$$Fe \rightarrow Fe^{2+} + 2e^- \quad (1)$$

$$2H^+ + 2e^- \rightarrow H_2 \quad (2)$$

Each of the corrosion tests and the measurement of the generated gas quantity in the test were made as follows:

In the corrosion test, a sealed tube (a glass ample) made of Pyrex (registered trademark) glass was used. The sealed tube was produced as follows:

A test piece (the SS400; a length of 10 mm, a width of 4 mm, and a thickness of 0.5 mm), and 20 mL of the above-mentioned alkali-added mixed cooling medium which was each test liquid were put into a glass tube having a bottom; the glass tube was connected to a vacuum pump; under a condition of a decreased pressure of 2 mmHg at 298 K, the tube was deaerated for 15 minutes while ultrasonic vibration was applied to the tube; and then, an opening in the tube was sealed up to produce the sealed tube. The sealed tube was held in a thermostat having a temperature kept at 90° C. for 500 hours.

After the corrosion test, the glass ample was put into a glass-ample-crushing vessel connected to a mercury manometer, and the inside of the crushing vessel was decreased to a pressure of 2 mmHg or less. After the glass ample was crushed, the generated gas quantity was calculated out from a variation in the value of the mercury manometer.

Each of the used test pieces was the SS400 (oxygen-free copper was used for some of tests that will be described later). In the present specification, the SS400 was used as a typical example of a carbon steel. However, the steel material used as the structural material of the absorption refrigerator is not limited to this material. Thus, the structural material may be any other carbon steel or some other.

Table 1 shows the quantity of the gas (hydrogen) generated in each of some of the made corrosion tests using, as its test liquid, the mixed cooling medium to which one of the various alkalis was added. In the test, the molar fraction of water in the mixed cooling medium was 0.85.

TABLE 1

Gas (hydrogen) quantity generated by corrosion of SS400 immersed in a mixed coolant to which each of various alkalis was added

| | Comparative Example 1 | Example 1 | Example 2 | Example 3 | Example 4 | Comparative Example 2 | Comparative Example 3 | Comparative Example 4 |
|---|---|---|---|---|---|---|---|---|
| Additive: corrosion inhibitor | — | LiOH | LiOH | $Ca(OH)_2$ | NaOH | $NH_3$ | $NH_3$ | $Na_2CO_3$ |
| Concentration (M) | — | 0.125 | 0.02 | 0.02 | 0.1 | 1.0 | 0.1 | 0.1 |
| Molar fraction of water | 0.85 | 0.85 | 0.85 | 0.85 | 0.85 | 0.85 | 0.85 | 0.85 |
| pH | 5.2 | 12.0 | 11.6 | 12.3 | 11.2 | 11.4 | 11.2 | 11.5 |
| Generated gas quantity ($ml/dm^2$) | 120 | 0.4 | 0.2 | 0.25 | 0.15 | 110 | 105 | 95 |

From this table, the following are understood:

Comparative Example 1 shows a result obtained by investigating the gas quantity generated in one of the made corrosion tests in the mixed cooling medium to which no corrosion inhibitor is added. The generated gas quantity is 120 mL/dm².

As shown in Example 1, when 0.125 M LiOH is added as a corrosion inhibitor, the generated gas quantity is 0.4 mL/dm². The generated gas quantity in Example 1 is decreased to 1/300 of that in Comparative Example 1; thus, as compared with Comparative Example 1, Example 1 shows a remarkably restrained corrosion.

Example 2 demonstrates a case where the LiOH concentration is made lower than that in Example 1 to be decreased to 0.02 M. In Example 2, the generated gas quantity is 0.2 mL/dm². Thus, even when the concentration is decreased, the corrosion quantity can be kept at a low level.

Examples 3 and 4 demonstrate cases where the cation species of their hydroxide is changed to Ca and Na, respectively, from Li. Even when the cation species is changed, the generated gas quantities are 0.25 dL/dm² and 0.15 mL/dm², respectively. Thus, even when the respective concentrations of these hydroxides are decreased, the resultant corrosion quantities can be kept at a low level.

Comparative Examples 2 and 3 demonstrate cases where $NH_3$ are added to the mixed cooling medium. The respective concentrations of $NH_3$ are 1.0 M, and 0.1 M. In these cases, the respective generated gas quantities are 110 mL/dm² and 105 mL/dm². These quantities are at a level equivalent to the level of the case demonstrated in Comparative Example 1, where no corrosion inhibitor is added. Thus, the corrosion is not restrained. The pH of each of these solutions is about 11 to be equivalent to the pH in each of Examples 1 to 4.

From these matters, it is unbelievable that the material SS400 is restrained from being corroded by a corrosion inhibitor since the corrosion inhibitor is an alkali.

Comparative Example 4 demonstrates a case where $Na_2CO_3$ is added. The pH thereof is equivalent to the pH (=11) in Examples 1 to 4. However, the generated gas quantity is 95 mL/dm². Thus, the corrosion is not restrained in the same way as in the case of $NH_3$.

Table 2 shows the gas (hydrogen) quantity generated in each of the others of the made corrosion tests using, as its test liquid, the mixed cooling medium into which one of the various alkalis was added. In the test, the molar fraction of water in the mixed cooling medium was 0.95.

TABLE 2

Gas (hydrogen) quantity generated by corrosion of SS400 immersed in a mixed coolant to which each of various alkalis was added

| | Comparative Example 5 | Example 5 | Example 6 | Example 7 | Example 8 | Comparative Example 6 | Comparative Example 7 | Comparative Example 8 |
|---|---|---|---|---|---|---|---|---|
| Additive: corrosion inhibitor | — | LiOH | LiOH | $Ca(OH)_2$ | NaOH | $NH_3$ | $NH_3$ | $Na_2CO_3$ |
| Concentration (M) | — | 0.125 | 0.02 | 0.02 | 0.1 | 1.0 | 0.1 | 0.1 |
| Molar fraction of water | 0.95 | 0.95 | 0.95 | 0.95 | 0.95 | 0.95 | 0.95 | 0.95 |
| pH | 5.4 | 11.8 | 11.5 | 12.0 | 11.1 | 11.0 | 10.9 | 11.1 |
| Generated gas quantity ($ml/dm^2$) | 80 | 0.15 | 0.25 | 0.08 | 0.12 | 75 | 60 | 65 |

From this table, the following are understood:

Comparative Example 5 shows a result obtained by investigating the gas quantity generated in one of the made corrosion tests in the mixed cooling medium to which no corrosion inhibitor is added. The generated gas quantity is 80 mL/dm².

Examples 5 and 6 demonstrate cases where LiOH is added as the corrosion inhibitor. Equivalently to the respective corresponding cases shown in Table 1, where the molar fraction of water is 0.85, the generated gas quantity is extremely lowered to restrain the corrosion.

Example 7 demonstrates a case where $Ca(OH)_2$ is added as the corrosion inhibitor. Equivalently to the corresponding case shown in Table 1, where the molar fraction of water is 0.85, the generated gas quantity is extremely lowered to restrain the corrosion.

Example 8 demonstrates a case where NaOH is added as the corrosion inhibitor. Equivalently to the corresponding case shown in Table 1, where the molar fraction of water is 0.85, the generated gas quantity is extremely lowered to restrain the corrosion.

However, when an alkali is used at a concentration equivalent to each of the concentrations as described above but the alkali is $NH_3$ shown in Comparative Example 6 or 7, or $Na_2CO_3$ shown in Comparative Example 8, no corrosion-restraining effect is exhibited in the same manner in the cases where the molar fraction of water is 0.85.

From these matters, it is unbelievable that the material SS400 is restrained from being corroded by a corrosion inhibitor since the corrosion inhibitor is an alkali.

Table 3 shows the gas (hydrogen) quantity generated in each corrosion test equivalent to the above-mentioned tests, using, as its test liquid, the mixed cooling medium to which one out of various oxoates was added. In the test, the molar fraction of water in the mixed cooling medium was 0.85. In this Table, Comparative Example 1 is also shown together.

the corrosion inhibitor. As compared with the case demonstrated as Comparative Example 1, in which no corrosion inhibitor is contained, this case shows an extremely lowered generated gas quantity so that the corrosion is restrained.

Example 13 demonstrates a case where sodium benzenesulfonate ($C_6H_5NaO_3S$) is added as the corrosion inhibitor. As compared with the case demonstrated as Comparative Example 1, in which no corrosion inhibitor is contained, this case shows an extremely lowered generated gas quantity so that the corrosion is restrained.

Example 14 demonstrates a case where sodium perchlorate ($NaClO_4$) is added as the corrosion inhibitor. As compared with the case demonstrated as Comparative Example

TABLE 3

Gas (hydrogen) quantity generated by corrosion of SS400 immersed in a mixed coolant to which each of various corrosion inhibitors was added

|  | Comparative Example 1 | Example 9 | Example 10 | Example 11 | Example 12 | Example 13 | Example 14 |
|---|---|---|---|---|---|---|---|
| Additive: corrosion inhibitor | — | $Li_2MoO_4$ | $Na_3VO_4$ | $Na_2SiO_3$ | $HNa_2O_3P$ | $C_6H_5NaO_3S$ (sodium benzenesulfonate) | $NaClO_4$ |
| Concentration (M) | — | 0.01 | 0.01 | 0.01 | 0.01 | 0.01 | 0.01 |
| Molar fraction of water | 0.85 | 0.85 | 0.85 | 0.85 | 0.85 | 0.85 | 0.85 |
| pH | 5.2 | 5.4 | 5.8 | 4.8 | 4.9 | 5.2 | 4.7 |
| Generated gas quantity (ml/dm$^2$) | 120 | 0.08 | 0.1 | 0.25 | 0.3 | 0.22 | 0.18 |

From this table, the following are understood:

Example 9 demonstrates a case where $Li_2MoO_4$ is added as the corrosion inhibitor. As compared with the case demonstrated as Comparative Example 1, in which no corrosion inhibitor is contained, this case shows an extremely lowered generated gas quantity so that the corrosion is restrained.

Example 10 demonstrates a case where sodium orthovanadiate ($Na_3VO_4$) is added as the corrosion inhibitor. As compared with the case demonstrated as Comparative Example 1, in which no corrosion inhibitor is contained, this case shows an extremely lowered generated gas quantity so that the corrosion is restrained.

Example 11 demonstrates a case where sodium metasilicate ($Na_2SiO_3$) is added as the corrosion inhibitor. As compared with the case demonstrated as Comparative Example 1, in which no corrosion inhibitor is contained, this case shows an extremely lowered generated gas quantity so that the corrosion is restrained.

Example 12 demonstrates a case where sodium phosphonate ($HNa_2O_3P$ (disodium hydrogenphosphite) is added as 1, in which no corrosion inhibitor is contained, this case shows an extremely lowered generated gas quantity so that the corrosion is restrained.

The corrosion inhibitors in Examples 9 to 14 are collectively called the "oxoate" in the present specification. As demonstrated in these working examples, when the oxoate is added at various low concentrations, the oxoate exhibits a remarkable corrosion-restraining effect in the same manner as in the case of the addition of the alkali even when the oxoate-added mixed cooling medium is hardly varied in pH.

Table 4 shows a result obtained by making each corrosion test equivalent to the above-mentioned tests, using a test liquid in which one out of various absorption type corrosion inhibitors used in ordinary cooling-water was added to the water/1,4-dioxane mixed cooling medium. In the mixed cooling medium, the molar fraction of water was 0.85. The testing temperature was 90° C. In this table, Comparative Example 1 is also shown together.

TABLE 4

Gas (hydrogen) quantity generated by corrosion of SS400 immersed in a mixed coolant to which each of various adsorption-type corrosion inhibitors was added

|  | Comparative Example 1 | Comparative Example 9 | Comparative Example 10 | Comparative Example 11 | Comparative Example 12 |
|---|---|---|---|---|---|
| Additive: corrosion inhibitor | — | $C_6H_{12}N_4$ hexamethylenetetramine) | $CH_4N_2S$ (thiourea) | Dimethylhexadecylamine | Hexanethiol |
| Concentration (M) | — | 0.1 | 0.1 | 0.1 | 0.01 |
| Molar fraction of water | 0.85 | 0.85 | 0.85 | 0.85 | 0.85 |
| pH | 5.2 | 5.2 | 5.3 | 5.0 | 4.9 |
| Generated gas quantity (ml/dm$^2$) | 120 | 115 | 93 | 120 | 118 |

From this table, the following are understood:

Comparative Example 9 demonstrates a case where hexamethylenetetramine, which is used as a corrosion inhibitor in cooling-water, is added. Even when hexamethylenetetramine, which exhibits a corrosion-restraining effect in cooling-water, is added to the water/dioxane mixed cooling medium, this compound does not exhibit any corrosion-restraining effect in the cooling medium.

Comparative Example 10 demonstrates a case where thiourea, which is used as a corrosion inhibitor in cooling-water, is added. Even when thiourea, which exhibits a corrosion-restraining effect in cooling-water, is added to the water/dioxane mixed cooling medium, this compound does not exhibit any corrosion-restraining effect in the cooling medium.

Comparative Example 11 demonstrates a case where dimethylhexadecylamine, which is used as a corrosion inhibitor in cooling-water, is added. Even when dimethylhexadecylamine, which exhibits a corrosion-restraining effect in cooling-water, is added to the water/dioxane mixed cooling medium, this compound does not exhibit any corrosion-restraining effect in the cooling medium.

Comparative Example 12 demonstrates a case where hexanethiol, which is used as a corrosion inhibitor in cooling-water, is added. Even when hexanethiol, which exhibits a corrosion-restraining effect in cooling-water, is added to the water/dioxane mixed cooling medium, this compound does not exhibit any corrosion-restraining effect in the cooling medium.

Table 5 shows a result obtained by making each corrosion test equivalent to the afore-mentioned corrosion tests, using a test liquid in which one out of various oxidation type corrosion inhibitors used in ordinary cooling-water was added to the water/1,4-dioxane mixed cooling medium. In the mixed cooling medium, the molar fraction of water was 0.85. The testing temperature was 90° C. In this table, Comparative Example 1 is also shown together.

TABLE 5

Gas (hydrogen) quantity generated by corrosion of SS400 immersed in a mixed coolant to which each of various oxidation-type corrosion inhibitors was added

| | Comparative Example 1 | Comparative Example 13 | Comparative Example 14 | Comparative Example 15 | Comparative Example 16 |
|---|---|---|---|---|---|
| Additive: corrosion inhibitor | — | Hydrogen peroxide | Potassium nitrate | Sodium nitrite | Ceriumammonium nitrate |
| Concentration (M) | — | 1.0M | 0.1M | 0.1M | 0.05M |
| Molar fraction of water | 0.85 | 0.85 | 0.85 | 0.85 | 0.85 |
| pH | 5.2 | 4.8 | 5.3 | 5.5 | 4.1 |
| Generated gas quantity (ml/dm$^2$) | 120 | 98 | 113 | 105 | 145 |

From this table, the following are understood:

Comparative Example 13 demonstrates a case where hydrogen peroxide is added to the water/dioxane mixed cooling medium. Even by the addition of hydrogen peroxide, the peroxide does not exhibit any corrosion-restraining effect in this cooling medium.

Comparative Example 14 demonstrates a case where nitrate ions (potassium nitrate) are added to the water/dioxane mixed cooling medium. Even by the addition of potassium nitrate, which exhibits a corrosion-restraining effect in cooling-water, the nitrate does not exhibit any corrosion-restraining effect in this cooling medium.

Comparative Example 15 demonstrates a case where nitrite ions (sodium nitrite) are added to the water/dioxane mixed cooling medium. Even by the addition of sodium nitrite, which exhibits a corrosion-restraining effect in cooling-water, the nitrite does not exhibit any corrosion-restraining effect in this cooling medium.

Comparative Example 16 demonstrates a case where nitrate ions (ceriumammonium nitrate) are added to the water/dioxane mixed cooling medium. Even by the addition of ceriumammonium nitrate, which exhibits a corrosion-restraining effect in cooling water, the nitrate does not exhibit any corrosion-restraining effect in this cooling medium.

Table 6 shows a result obtained by making each corrosion test equivalent to the afore-mentioned corrosion tests, using a test liquid in which one out of various precipitation type corrosion inhibitors used in ordinary cooling-water was added to the water/1,4-dioxane mixed cooling medium. The molar fraction of water in the mixed cooling medium was 0.85. The test temperature was 90° C. In this table, Comparative Example 1 is also shown together.

TABLE 6

Gas (hydrogen) quantity generated by corrosion of SS400 immersed in a mixed coolant to which each of various precipitation-type corrosion inhibitors was added

| | Comparative Example 1 | Comparative Example 17 | Comparative Example 18 | Comparative Example 19 |
|---|---|---|---|---|
| Additive: corrosion inhibitor | — | Ce(NO$_3$)$_3$ | 8-Qinolinol | Sodium octylpropionate |
| Concentration (M) | — | 0.01 | 0.1 | 0.1 |
| Molar fraction of water | 0.85 | 0.85 | 0.85 | 0.85 |
| pH | 5.2 | 4.9 | 5.0 | 4.2 |
| Generated gas quantity (ml/dm$^2$) | 120 | 103 | 96 | 89 |

From this table, the following are understood:

Comparative Example 17 demonstrates a case where cerium nitrate is added to the water/dioxane mixed cooling medium. Even by the addition of cerium nitrate, the nitrate does not exhibit any corrosion-restraining effect in this cooling medium.

Comparative Example 18 demonstrates a case where 8-quinolinol is added to the water/dioxane mixed cooling medium. Even by the addition of 8-quinolinol, this compound does not exhibit any corrosion-restraining effect in this cooling medium.

Comparative Example 19 demonstrates a case where sodium octylpropionate is added to the water/dioxane mixed cooling medium. Even by the addition of sodium octylpropionate, the salt does not exhibit any corrosion-restraining effect in this cooling medium.

Table 7 shows a result obtained by making each corrosion test equivalent to the afore-mentioned corrosion tests, using a test liquid in which one out of various combinations of an oxoate with an alkali metal hydroxide was added to the water/1,4-dioxane mixed cooling medium. In this table, Comparative Example 1 is also shows together.

TABLE 7

Gas (hydrogen) quantity generated by corrosion of SS400 immersed in a mixed coolant to which each combination of an oxoate and a hydroxide of an alkali metal was added

| | Comparative Example 1 | Example 15 | Example 16 | Example 17 | Example 18 |
|---|---|---|---|---|---|
| Additive: corrosion inhibitor (1) | — | LiOH | LiOH | Ca(OH)$_2$ | NaOH |
| Concentration (M) | | 0.1 | 0.05 | 0.02 | 0.1 |
| Additive: corrosion inhibitor (2) | — | Li$_2$MoO$_4$ | C$_6$H$_5$NaO$_3$S (sodium benzenesulfonate) | Na$_2$VO$_4$ | HNa$_2$O$_3$P |
| Concentration (M) | — | 0.01 | 0.01 | 0.01 | 0.01 |
| Molar fraction of water | 0.85 | 0.85 | 0.85 | 0.85 | 0.85 |
| pH | 5.2 | 11.8 | 11.9 | 11.5 | 11.9 |
| Generated gas quantity (ml/dm$^2$) | 120 | 0.35 | 0.25 | 0.32 | 0.28 |

From this table, the following are understood:

Example 15 demonstrates a case where lithium hydroxide and lithium molybdate are added as corrosion inhibitors. Example 15 shows an extremely lowered generated gas quantity as compared with Comparative Example 1, which contains no corrosion inhibitor, so that the corrosion is restrained.

Additionally, in Example 15, the additives are additives used also for an absorption liquid in the absorber. For this reason, even when mist of the mixed cooling medium in the evaporator is blended into the absorption liquid in the absorber, only a small effect is produced. Thus, it can be mentioned that the corrosion inhibitors are most preferable corrosion inhibitors.

Example 16 demonstrates a case where lithium hydroxide and sodium benzenesulfonate are added as corrosion inhibitors. Example 16 shows an extremely lowered generated gas quantity as compared with Comparative Example 1, which contains no corrosion inhibitor, so that the corrosion is restrained.

Example 17 demonstrates a case where calcium hydroxide and sodium orthovanadate are added as corrosion inhibitors. Example 17 shows an extremely lowered generated gas quantity as compared with Comparative Example 1, which contains no corrosion inhibitor, so that the corrosion is restrained.

Example 18 demonstrates a case where sodium hydroxide and sodium phosphonate are added as corrosion inhibitors. Example 18 shows an extremely lowered generated gas quantity as compared with Comparative Example 1, which contains no corrosion inhibitor, so that the corrosion is restrained.

Table 8 shows a solidifying point of a solution in which each of various corrosion inhibitors was added to the water/dioxane mixed cooling medium. The molar fraction of water in the mixed cooling medium was 0.85.

TABLE 8

Solidifying point of water/dioxane/corrosion-inhibitor solution

| Molar fraction of water | Corrosion inhibitor: none | Corrosion inhibitors | | | |
|---|---|---|---|---|---|
| | | LiOH (0.05M) | LiOH (0.1M) | Li$_2$MoO$_4$ (0.01M) | Li$_2$MoO$_4$ (0.002M) |
| 0.85 | −15° C. | −16° C. | −19° C. | −17° C. | −15° C. |

From this table, the following are understood:

When no corrosion inhibitor is added thereto, the solidifying point of the solution is −15° C.

Also when each of the corrosion inhibitors is added thereto, the solidifying point is slightly varied. The solidifying point tends to be lowered by a temperature of 0 to 4° C. The lowering in the solidifying point does not produce an effect onto the absorption refrigerator of the present invention. Thus, the addition of the corrosion inhibitor can keep characteristics of the water/dioxane mixed cooling medium.

Figure 2:
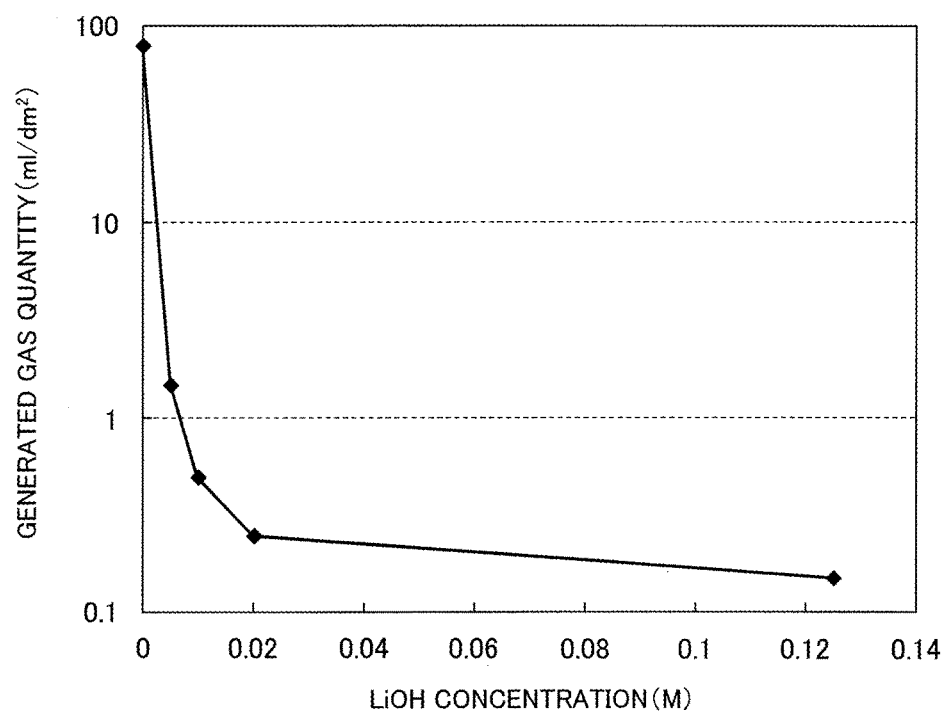
FIG. 2 is a graph showing a dependency of a gas quantity generated in each corrosion test of a material SS400 upon a concentration of LiOH which is a corrosion inhibitor, the corrosion test using a mixed cooling medium to which LiOH was added.

FIG. 2 is a graph showing a dependency of the gas quantity generated in each corrosion test using the mixed cooling medium to which LiOH was added upon the concentration of the alkali. Each test piece used therein was a material SS400.

As shown in FIG. 2, by adding LiOH at a concentration of 0.005 M, the generated gas quantity is abruptly lowered to about 1/80. Thus, the addition of LiOH at a concentration of at least 0.005 M makes it possible to restrain the corrosion sufficiently. When the LiOH is added up to 0.02 M, the generated gas quantity lowers as the LiOH-added amount is increased. However, at a concentration of 0.02 M or more, the degree of the lowering in the generated gas quantity is decreased.

Figure 3:
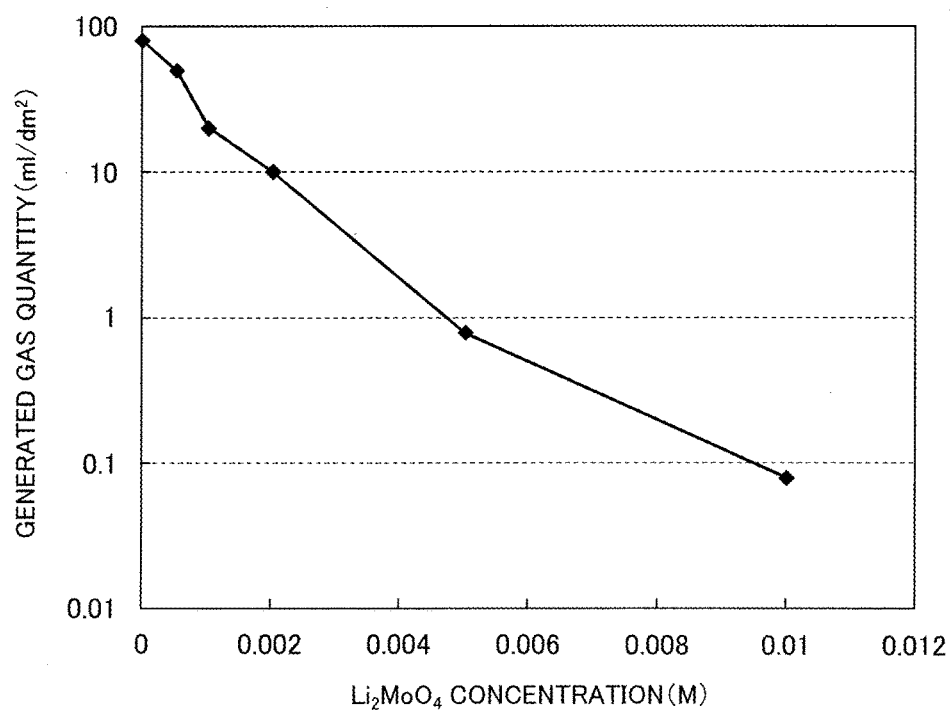
FIG. 3 is a graph showing a dependency of a gas quantity generated in each corrosion test of a material SS400 upon the concentration of $Li_2MoO_4$ which is a corrosion inhibitor, the corrosion test using a mixed cooling medium to which $Li_2MoO_4$ was added.

FIG. 3 shows a dependency of the gas quantity generated in each corrosion test using the mixed cooling medium to which Li$_2$MoO$_4$ was added upon the concentration of Li$_2$MoO$_4$. Each test piece used therein was a material SS400.

From this figure, it is understood that: as the concentration of $Li_2MoO_4$ added is increased, the generated gas quantity linearly lowers in a logarithmic manner thereto. By the addition thereof at a concentration of 0.002 M, the generated gas quantity lowers to about 1/10 of that in the case of no addition of $Li_2MoO_4$; thus, the corrosion can be sufficiently restrained.

The following will describe results obtained by making corrosion tests about oxygen-free copper, which is a structural material other than the material SS400 of the absorption refrigerator.

In each of the corrosion tests, in the same way as in the above-mentioned SS400 corrosion tests, a sealed tube made of Pyrex (registered trademark) glass (glass ample) was produced. The sealed tube was kept in a thermostat having a temperature kept at 90° C. over at longest 2000 hours.

After the corrosion test, the test piece was taken out, and the corrosion quantity thereof was calculated out from the difference between the mass of the test piece before the corrosion test and that after this test.

Figure 4:
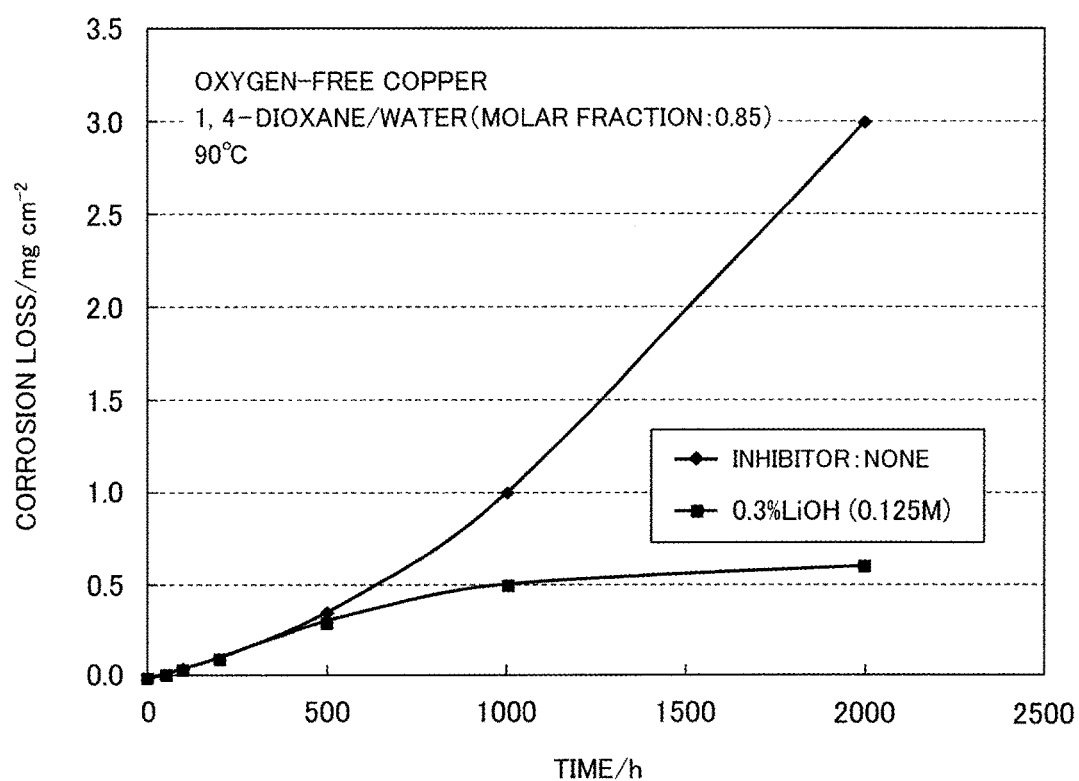
FIG. 4 is a graph showing a change with time in a corrosion quantity of an oxygen-free copper in mixed cooling mediums.

FIG. 4 is a graph showing a change with time in the corrosion quantity of oxygen-free copper in the water/1,4-dioxane mixed cooling medium (molar fraction of water: 0.85) at 90° C.

When no inhibitor (corrosion inhibitor) is added to the cooling medium, the corrosion quantity rises up abruptly after 500 hours elapse, so as to increase linearly with time. By contrast, when the inhibitor of LiOH is added thereto at a concentration of 0.3% (0.125 M), the corrosion quantity is equivalent to that when no inhibitor coexists with the cooling medium till 500 hours. However, after 500 hours, the corrosion rate lowers with time. From this matter, it is understood that the addition of LiOH at the concentration of 0.3% makes it possible to restrain the corrosion of copper.

Table 9 shows the corrosion quantity obtained when oxygen-free copper was immersed over 2000 hours in the mixed cooling medium to which each corrosion inhibitor other than the 0.3% LiOH was added as the corrosion inhibitor. The molar fraction of water was 0.85, and the temperature was 90° C. Table 9 also shows the case where no corrosion inhibitor was added to the medium.

TABLE 9

| Corrosion inhibitor: none | Corrosion inhibitors | | | | | |
|---|---|---|---|---|---|---|
| | LiOH (0.02M) | NaOH (0.125M) | NaOH (0.02M) | Ca(OH)$_2$ (0.02M) | Li$_2$MoO$_4$ (0.01M) + LiOH (0.02M) | NH$_3$ (0.125M) |
| 3.0 | 0.8 | 0.65 | 0.85 | 0.90 | 0.8 | 15.5 |

(Unit: mg/cm$^2$)

From this table, it is understood that an effect of restraining the corrosion of copper is exhibited in the case of lowering the LiOH concentration to 0.02 M, in the case of adding NaOH or Ca(OH)$_2$ instead of LiOH, and in the case of adding the combination of LiOH with $Li_2MoO_4$ in the same manner as in the case of using the 0.125M LiOH.

By contrast, when an alkali is added but the alkali is $NH_3$, no corrosion-restraining effect is exhibited; conversely, the corrosion is accelerated. This would be because copper and ammonia form a complex.

For the results in FIG. 4 and Table 9, oxygen-free copper was used as an example of the copper alloy. However, the copper alloy is not limited thereto, and may be, for example, 7-3CuNi alloy or 9-1CuNi alloy.

In absorption refrigerators in each of which the working medium of the lithium-bromide/water system is used to generate the cold energy corresponding to the freezing point of water or lower, a means for adding 1,4-dioxane to water as a cooling medium has been hitherto known in order to make this apparatus simple and small, and attain some other purpose. However, no technique has been known for decreasing the corrosiveness of the mixed cooling medium in which 1,4-dioxane is added to water.

According to the present invention, the addition of the hydroxide of the alkali metal or alkaline earth metal or the oxoate to the water/dioxane mixed cooling medium makes it possible to decrease the corrosion of the structural material in the cooling medium largely, and configure the apparatus using this cooling medium.

What is claimed is:

1. A working medium for absorption refrigerators that is to contact a carbon steel or a copper alloy that is a structural material of any one of the absorption refrigerators,
the working medium comprising:
water; and 1,4-dioxane,
and further comprising a corrosion inhibitor,
wherein the selected corrosion inhibitor is one or more of lithium hydroxide or lithium molybdate.

2. The working medium according to claim 1,
having a solidifying point of 0° C. or lower.

3. An absorption refrigerator comprising:
an evaporator;
an absorber;
a generator; and
a condenser,
wherein the working medium recited in claim 1 is used as a cooling medium circulated in the evaporator and the condenser.

* * * * *